(12) United States Patent
Park

(10) Patent No.: US 12,255,012 B2
(45) Date of Patent: Mar. 18, 2025

(54) BUSHING-TYPE CURRENT TRANSFORMER, AND SWITCHBOARD HAVING CURRENT TRANSFORMER APPLIED THERETO

(71) Applicant: LS ELECTRIC CO., LTD., Anyang-si (KR)

(72) Inventor: Yong Jun Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 469 days.

(21) Appl. No.: 17/760,894

(22) PCT Filed: Mar. 12, 2020

(86) PCT No.: PCT/KR2020/003443
§ 371 (c)(1),
(2) Date: Mar. 16, 2022

(87) PCT Pub. No.: WO2021/054555
PCT Pub. Date: Mar. 25, 2021

(65) Prior Publication Data
US 2022/0344095 A1 Oct. 27, 2022

(30) Foreign Application Priority Data

Sep. 18, 2019 (KR) ........................ 10-2019-0114714

(51) Int. Cl.
*H01F 38/30* (2006.01)
*H01F 27/06* (2006.01)
(Continued)

(52) U.S. Cl.
CPC ............. *H01F 38/30* (2013.01); *H01F 27/06* (2013.01); *H02B 1/04* (2013.01); *H02B 11/04* (2013.01)

(58) Field of Classification Search
CPC .... H01F 38/28–30; H01F 27/02; H01F 27/06; H02B 1/03; H02B 1/04;
(Continued)

(56) References Cited

U.S. PATENT DOCUMENTS

| 6,487,912 B1 | 12/2002 | Behm et al. | |
| 2013/0186683 A1* | 7/2013 | Xu | H01B 17/42 |
| | | | 174/650 |

(Continued)

FOREIGN PATENT DOCUMENTS

| CN | 1175693 A | 3/1998 |
| CN | 1229531 A | 9/1999 |

(Continued)

OTHER PUBLICATIONS

KR-200226045-Y1 English Translation (Year: 2001).*
(Continued)

*Primary Examiner* — Amir A Jalali
(74) *Attorney, Agent, or Firm* — K&L Gates LLP

(57) ABSTRACT

The present disclosure relates to a bushing-type current transformer, and a switchboard having the bushing-type current transformer applied thereto, comprising: a binding plate; a bushing including a first fixing part and a second fixing part located on each of the two sides of the binding plate and each providing an accommodating space; and a current transformer fitted and fixed to the first fixing part of the bushing.

5 Claims, 6 Drawing Sheets

(51) Int. Cl.
*H02B 1/04* (2006.01)
*H02B 11/04* (2006.01)

(58) Field of Classification Search
CPC ...... H02B 11/04; H02B 13/0356; H02B 3/00; H02G 15/02
See application file for complete search history.

(56) References Cited

U.S. PATENT DOCUMENTS

| | | | | |
|---|---|---|---|---|
| 2015/0162726 | A1* | 6/2015 | Kutalek | H02B 11/26 361/605 |
| 2015/0244156 | A1* | 8/2015 | Kutalek | H02B 11/04 174/668 |
| 2016/0164268 | A1* | 6/2016 | Yang | H02B 11/26 361/620 |
| 2016/0197459 | A1* | 7/2016 | Motta | H02B 3/00 29/602.1 |
| 2018/0090914 | A1* | 3/2018 | Johnson | H02B 1/306 |
| 2021/0065972 | A1* | 3/2021 | Ma | H01F 27/04 |
| 2022/0368115 | A1* | 11/2022 | Kim | H02B 13/025 |

FOREIGN PATENT DOCUMENTS

| | | |
|---|---|---|
| CN | 103916005 A | 7/2014 |
| CN | 207884038 U | 9/2018 |
| JP | 2002260450000 | 3/2001 |
| KR | 200226045 Y1 * | 3/2001 |
| KR | 1020040108090 | 12/2004 |
| KR | 1020130086179 | 7/2013 |
| KR | 1020160066965 | 9/2019 |
| KR | 1020190101691 | 9/2019 |

OTHER PUBLICATIONS

International Search Report for related International Application No. PCT/KR2020/003443; report dated Mar. 25, 2021; (5 pages).
Written Opinion for related International Application No. PCT/KR2020/003443; report dated Mar. 25, 2021; (4 pages).
Notice of Allowance for related Chinese Application No. 202080063558.8; action dated Aug. 23, 2024; (8 pages).

* cited by examiner

BUSHING-TYPE CURRENT TRANSFORMER, AND SWITCHBOARD HAVING CURRENT TRANSFORMER APPLIED THERETO

CROSS-REFERENCE TO RELATED APPLICATION

The present application is a National Stage of International Application No. PCT/KR2020/003443 filed on Mar. 12, 2020, which claims priority to and the benefit of Korean Patent Application No. 10-2019-0114714, filed on Sep. 18, 2019, the disclosure of which is incorporated herein by reference in its entirety.

FIELD

The present disclosure relates to a bushing-type current transformer, and a switchboard having the bushing-type current transformer applied thereto, and more particularly, to a bushing-type current transformer, and a switchboard having the bushing-type current transformer applied thereto, which is easy to install and maintain.

BACKGROUND

In general, a switchboard is a device used for monitoring, control, and protection of a power system, and in the switchboard, various electric devices such as circuit breakers and current transformers are accommodated and used for operation or control of power plants and substations, and operation of electric motors.

As such, among the electric devices accommodated in the switchboard, the front-mounted devices can be maintained from the front, but the rear-mounted devices are difficult to maintain unless the maintenance space between the rear part of the switchboard and the rear wall is secured over a certain part or unless it can be entered the switchboard through the front part.

In consideration of this problem, in Registered Korean Patent No. 10-1658542 (SWITCHBOARD APPLIED WITH BUSHING-TYPE CURRENT TRANSFORMER, registered on Sep. 12, 2016), to which the applicant of the present disclosure is the right holder, a switchboard structure that can be maintained by entering the circuit breaker chamber and transformer chamber from the front direction is proposed.

Briefly explaining the contents of the above registered patent, it includes a terminal bushing inserted and installed from a front direction, a switchboard terminal having one end coupled to the terminal bushing, a metering current transformer bushing inserted from a front direction and inserted into the terminal bushing while wrapping the switchboard terminal, and a metering current transformer inserted and installed in the metering current transformer bushing.

That is, in the structure in which the terminal is inserted in the current transformer bushing to which the current transformer is coupled to the outer surface, a structure using a terminal bushing separate from the current transformer bushing is proposed.

This configuration has the effect that maintenance can be easily performed from the front direction of the switchboard, but improvement is required because the number of components is relatively large.

The increase in the number of components delays installation and maintenance time because it takes a lot of time to combine or disassemble in installation or maintenance.

In addition, the structure proposed in the above registered patent requires more work time because an individual bushing-type current transformer is applied to each of the phases (for example, three phases) of the applied power source.

SUMMARY

The problem to be solved by the present disclosure reflecting the needs of the market as described above is to provide a bushing-type current transformer with a reduced number of assembly parts and a switchboard to which the bushing-type current transformer is applied.

In addition, another problem to be solved by the present disclosure is to provide a modularized bushing-type current transformer and a switchboard to which the bushing-type current transformer is applied so that it can be simultaneously applied to a plurality of phase power sources when the bushing-type current transformer is applied to a switchboard.

In addition, another problem to be solved by the present disclosure is to provide a bushing-type current transformer capable of substantially reducing the volume of the switchboard by providing a simple structure, and improving insulation performance, and a switchboard to which the bushing-type current transformer is applied.

A bushing-type current transformer according to an aspect of the present disclosure for solving the above technical problems relates to a bushing-type current transformer, and a switchboard having the bushing-type current transformer applied thereto, comprising: a binding plate; a bushing including a first fixing part and a second fixing part located on each of the two sides of the binding plate and each providing an accommodating space; and a current transformer fitted and fixed to the first fixing part of the bushing.

In an embodiment of the present disclosure, the binding plate may include a through hole communicating an accommodating space of each of the first fixing part and the second fixing part, and a terminal may be inserted and fixed into the through hole.

In an embodiment of the present disclosure, the terminal may be located in the accommodating space of the first fixing part and may be in contact with a busbar coupled to the accommodating space of the second fixing part.

In an embodiment of the present disclosure, the first fixing part may have a cylindrical structure, and a tab may be formed on the outer circumferential surface of the end thereof.

In an embodiment of the present disclosure, the second fixing part may have a rectangular cylindrical structure, and a busbar may be coupled thereto.

In addition, a switchboard having bushing-type current transformer applied thereto according to another aspect of the present disclosure may include bushing-type current transformers; and a coupling block including a fastening hole through which the second fixing part of the bushing-type current transformers is inserted, and coupled to an installation surface of the switchboard in a state of being coupled to the contact binding plate.

In an embodiment of the present disclosure, the coupling block may be coupled to the installation surface such that the first fixing part of the bushing-type current transformers is located on the front side and the second fixing part is located on the rear side.

In an embodiment of the present disclosure, the bushing-type current transformer can be maintained without removing the bushing from the front side of the switchboard.

The present disclosure simplifies the structure of the bushing-type current transformer, so that installation, maintenance and repair are easy, and the working time can be reduced.

In addition, the present disclosure modularizes the bushing-type current transformer and configures it to be applied to a plurality of phases at the same time when installation, maintenance and repair are performed on the switchboard, so that installation, maintenance and repair can be made easier, and the working time can be reduced.

In addition, according to the present disclosure, the volume of the switchboard can be substantially reduced by simplifying the structure of the bushing-type current transformer and reducing the length.

And when the present disclosure is applied to a switchboard, it is possible to improve insulation performance by using an epoxy material coupling block.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

<Description of Symbols>

Figure 1:
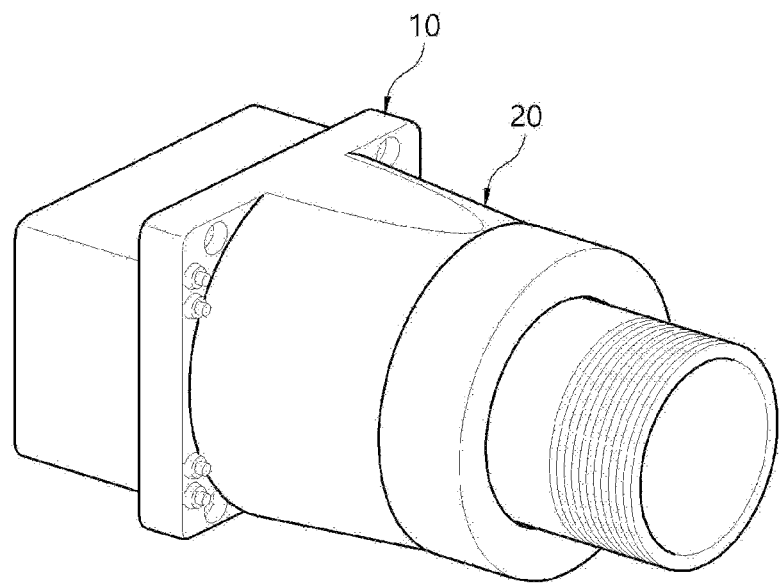
FIG. 1 is a perspective view of a bushing-type current transformer according to a preferred embodiment of the present disclosure.

10: bushing
11: binding plate
12: second fixing part
13: first fixing part
14: fastening hole
15: second accommodating space
16: first accommodating space
20: current transformer
30: terminal
31: fixing means
100: bushing-type current transformer part
200: coupling block

DETAILED DESCRIPTION

Hereinafter, in order to fully understand the configuration and effects of the present disclosure, preferred embodiments of the present disclosure will be described with reference to the accompanying drawings. However, the present disclosure is not limited to the embodiments disclosed below, and may be embodied in various forms and various modifications may be made. Rather, the description of the present disclosure is provided so that this disclosure will be thorough and complete and will fully convey the concept of the disclosure to those of ordinary skill in the art. In the accompanying drawings, the size of the elements is enlarged compared to actual ones for the convenience of description, and the ratio of each element may be exaggerated or reduced.

Terms such as 'first' and 'second' may be used to describe various elements, but, the above elements should not be limited by the terms above. The above terms may be used only for the purpose of distinguishing one element from another. For example, without departing from the scope of the present disclosure, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present disclosure may be interpreted as meanings commonly known to those of ordinary skill in the art.

Hereinafter, a bushing-type current transformer and a switchboard having the bushing-type current transformer applied thereto according to an embodiment of the present disclosure will be described in detail with reference to the drawings.

Figure 2:
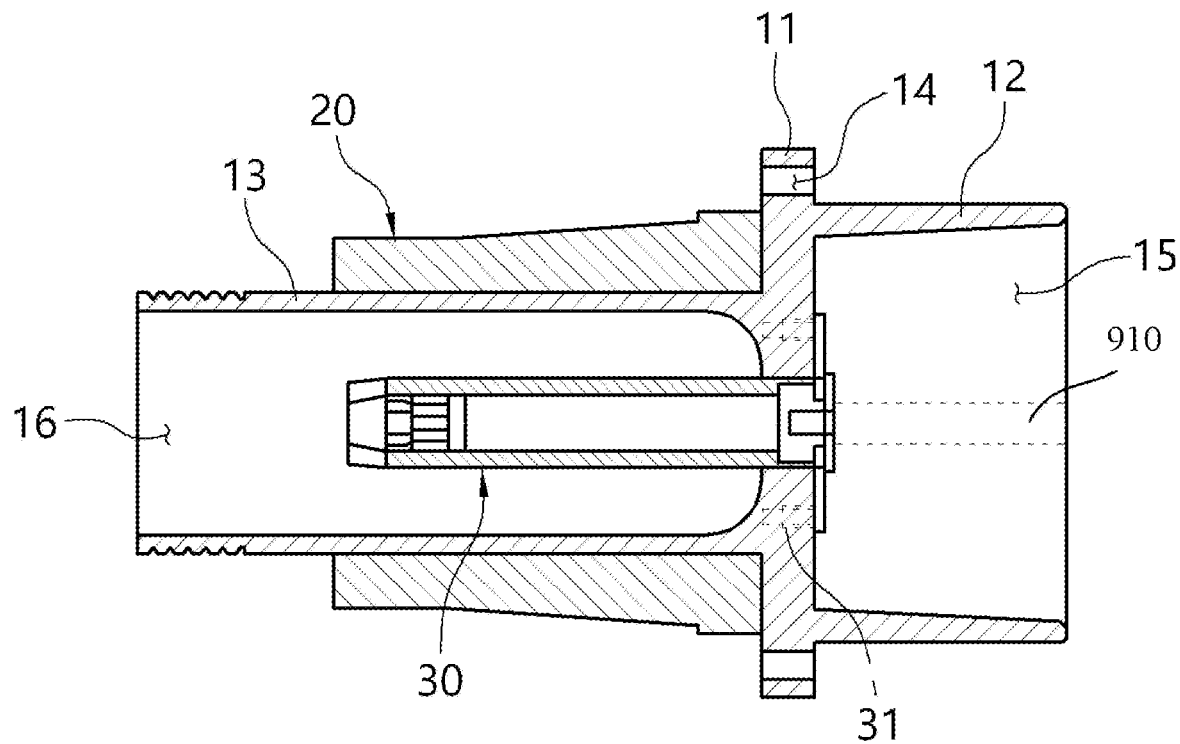
FIG. 2 is a cross-sectional configuration view of FIG. 1.

FIG. 1 is a perspective view of a bushing-type current transformer according to a preferred embodiment of the present disclosure, and FIG. 2 is a cross-sectional configuration view of FIG. 1.

Referring to FIGS. 1 and 2 respectively, the bushing-type current transformer according to a preferred embodiment of the present disclosure is configured to include a bushing 10, a current transformer 20, and a terminal 30.

The bushing 10 is configured to include a binding plate 11 having a plurality of fastening holes 14 formed therein, a first fixing part 13 protruding from one surface of the binding plate 11 and into which the current transformer 20 can be fitted and fixed, a first accommodating space 16 provided inside the first fixing part 13, a second fixing part 12 protruding from the other surface of the binding plate 11 and to which a busbar 910 of a circuit breaker chamber (not shown) is coupled, a second accommodating space 15 provided inside the second fixing part 12.

The binding plate 11 is provided with a through hole for communicating the first accommodating space 16 and the second accommodating space 15, and one end of the terminal 30 is fitted into the through hole, and is coupled and fixed to the binding plate 11 by a fixing means 31.

The configuration and operation of the bushing-type current transformer according to a preferred embodiment of the present disclosure having such a configuration will be described in more detail as follows.

In the present disclosure, when the structure of the bushing 10 of the current transformer 20 is changed and applied to a switchboard, the current transformer 20 is positioned inside the switchboard in a state while in contact with the binding plate 11. Here, the inside the switchboard corresponds to a current transformer chamber in the division of the switchboard, and the circuit breaker chamber is located on the front side of the current transformer chamber.

Conventionally, in addition to fixing a terminal to a bushing for fixing a current transformer, a terminal bushing to which a busbar 910 of a circuit breaker can be coupled was used, but in the present disclosure, all of the fixing of the current transformer 20, the fixing of the terminal 30, and the coupling of the busbar 910 can be performed with one bushing 10.

Looking at the structure of the bushing 10 in more detail, first, the binding plate 11 is a rectangular plate-shaped structure, and it is assumed that a plurality of fastening holes 14 are formed around it.

The function of the fastening hole 14 will be described in more detail later.

Although reference numerals are omitted from the drawings, a through hole is formed in the binding plate 11.

Although the binding plate 11 is illustrated and described as having a rectangular plate-shaped structure, it can be implemented by changing it to various shapes such as a disk shape.

A first fixing part 13, which is a cylindrical tubular structure, protrudes from one surface of the binding plate 11, and from the other surface of the binding plate 11 opposite to the surface on which the first fixing part 13 is located, a square cylindrical second fixing part 12 protrudes.

The first accommodating space 16 is provided by the first fixing part 13, and the second accommodating space 15 is provided by the second fixing part 12.

A tab is formed at the end of the first fixing part 13 to facilitate coupling with other parts, and the current transformer 20 having a cylindrical structure is fitted and fixed to the outer circumferential surface of the first fixing part.

In this case, it is preferable that one end of the current transformer 20 is in contact with one surface of the binding plate 11.

The second fixing part 12 is to provide a second accommodating space 15 capable of coupling the busbar 910 of the circuit breaker like a conventional terminal bushing, and can be changed to a shape required for coupling the busbar 910.

The terminal 30 connected to the busbar 910 is inserted into the through hole provided in the binding plate 11, and is located in the first accommodating space 16 of the first fixing part 13.

The current transformer 20 is coupled to the outer surface of the first fixing part 13 corresponding to the outside of the terminal 30.

The terminal 30 is firmly fixed to the binding plate 11 by a fixing means 31 such as a bolt.

In this case, the terminal 30 is in a state in which the contact point is exposed toward the second accommodating space 15.

Since the bushing-type current transformer of the present disclosure having such a structure uses one bushing 10, the number of components can be reduced, installation, maintenance and repair can be facilitated, and work time can be shortened.

In addition, the length can be reduced compared to the conventional bushing-type current transformer using the fastening method of the parts, and as a result, the volume of the switchboard can be reduced.

Figure 8:
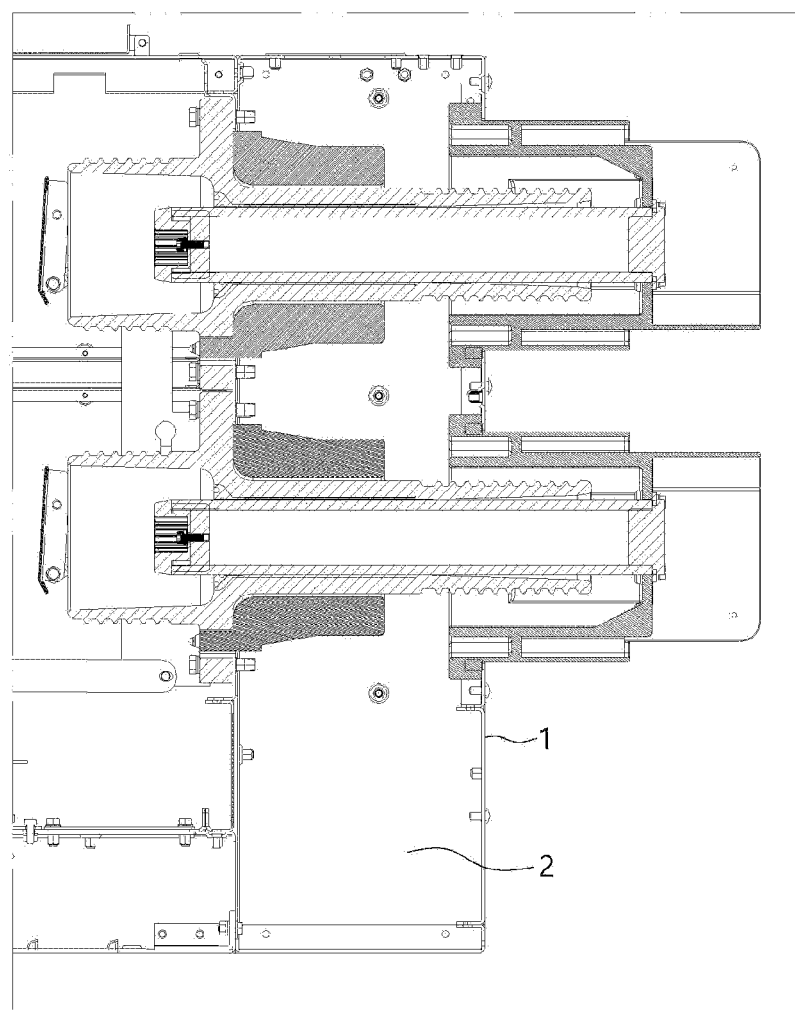
FIG. 8 is a partial configuration view of a conventional switchboard.

FIG. 8 is a partial configuration view of a conventional switchboard, wherein a partition wall 1 is provided between the circuit breaker chamber and the bushing-type current transformer to partition the current transformer chamber 2.

Since the coupling block, which will be described in more detail later, serves as a partition wall between the circuit breaker chamber and the bushing-type current transformer, it is possible to further reduce the volume of the switchboard by omitting the existing partition wall.

In addition, the present disclosure can reduce the weight relatively, there is a feature that can further improve the ease of operation.

The bushing-type current transformer of the present disclosure described with reference to FIGS. 1 and 2 is applied to the phases of individual power sources to detect a current, and a structure that combines a plurality of bushing-type current transformers and applies them to multiple phase power sources at the same time is proposed to further improve the ease of installation work, maintenance and repair work.

Figure 3:
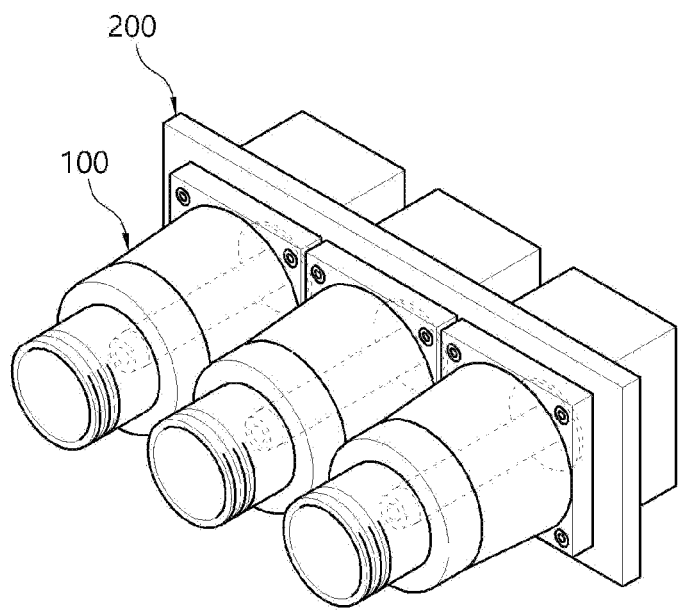
FIG. 3 is a perspective view of a bushing-type current transformer to be applied to a switchboard using a three-phase power source.
Figure 4:
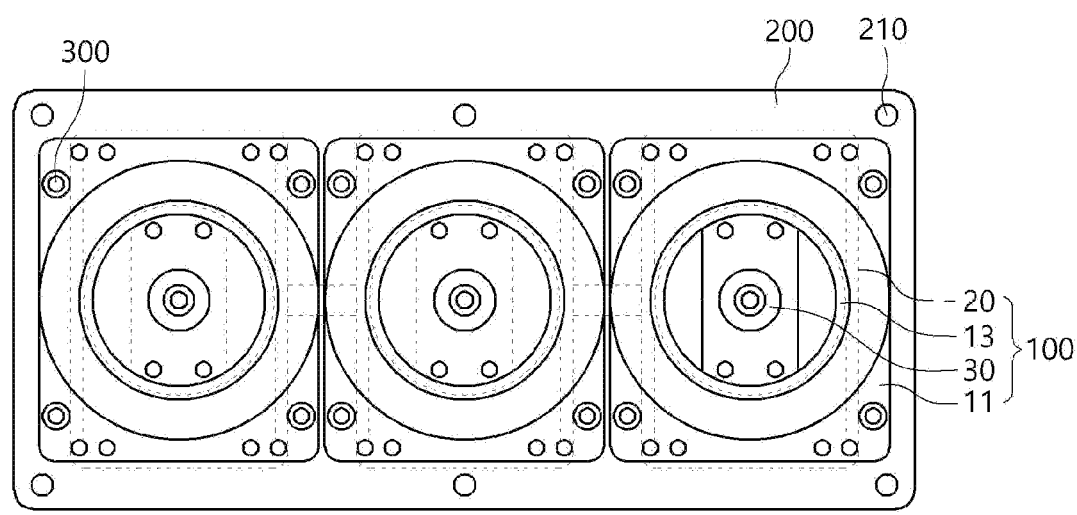
FIG. 4 is a front view of FIG. 2.
Figure 5:
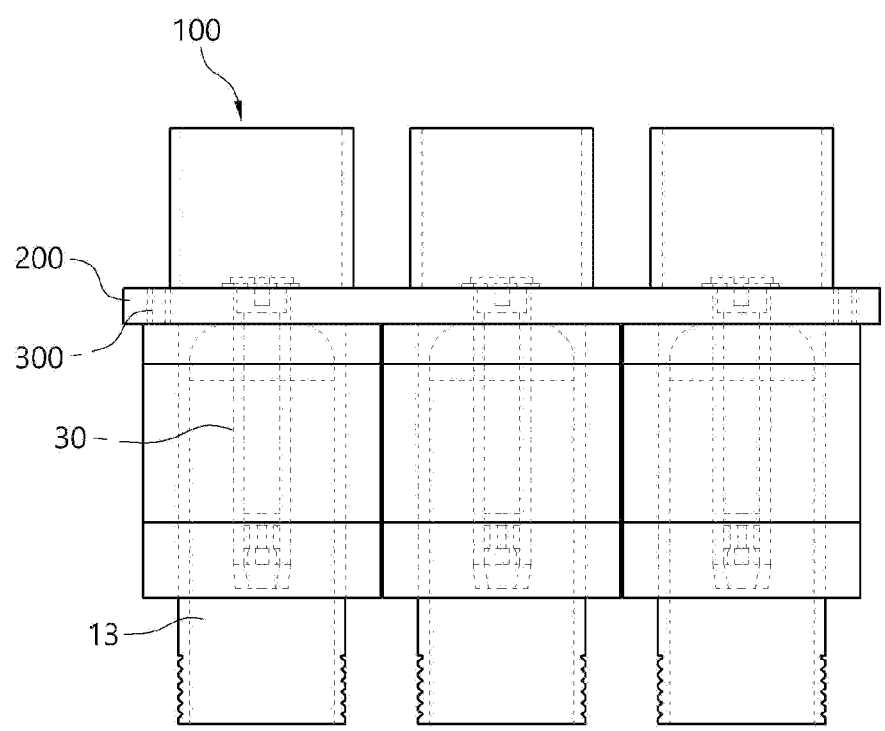
FIG. 5 is a partial perspective plan view of FIG. 2.

FIG. 3 is a perspective view of another embodiment of a bushing-type current transformer of the present disclosure for batch application to multiple phase power sources, FIG. 4 is a front view of FIG. 2, and FIG. 5 is a partial perspective plan view of FIG. 2.

Referring to FIGS. 3 to 5, respectively, in the present disclosure, the coupling block 200 provided with a plurality of through-holes and the bushing-type current transformers 100 having the same number as the number of through-holes of the coupling block 200 may be combined to form a single module.

The bushing-type current transformer 100 is the same as the configuration of the bushing-type current transformer described with reference to FIGS. 1 and 2 above, and is coupled such that the binding plate 11 is in contact with the coupling block 200 and the second fixing part 12 is inserted into the through hole of the coupling block 200.

The through hole of the coupling block 200 may be the same as the shape of the second fixing part 12 so as to be fitted and coupled.

It has been previously described that a plurality of fastening holes 14 are provided in the binding plate 11 of the bushing-type current transformer 100, and it can be coupled to the coupling block 200 using a fastening hole 14 and using a fastening means 300 such as bolts.

Fastening holes 210 that can fix the coupling block 200 with bolts when installed on the switchboard are formed at the edge of the coupling block 200.

When installing on a switchboard, the current transformer can be installed for multiple phases (three-phase in the drawing) by fixing the coupling block 200 to the installation position of the circuit breaker chamber, and during the maintenance work, the coupling block 200 is separated from the installation position of the switchboard, so that the maintenance and repair work can be easily performed, and the time required for the work can be reduced.

Figure 6:
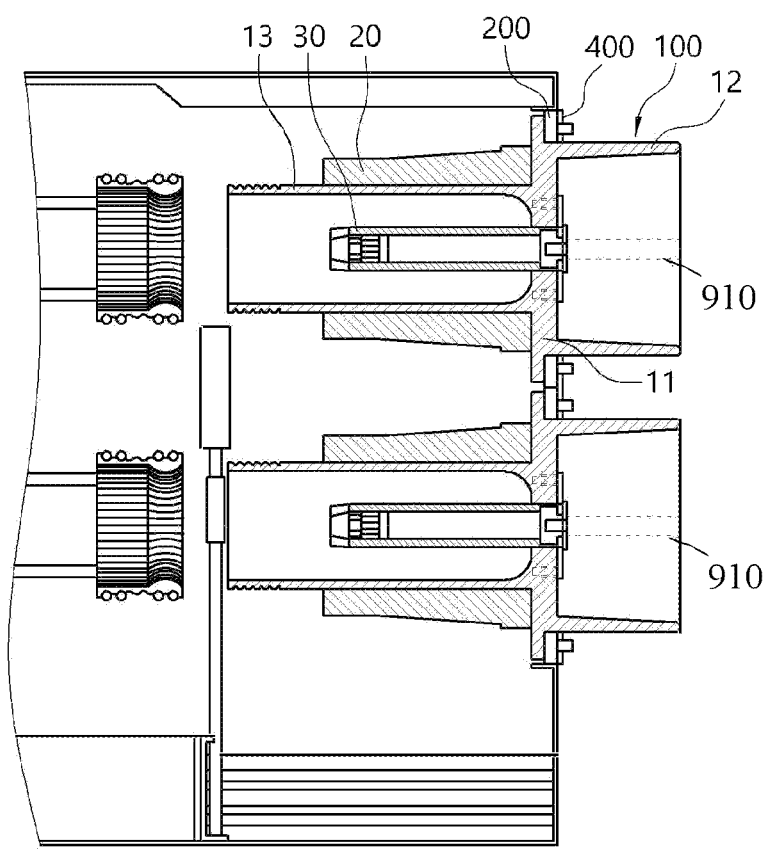
FIG. 6 is a partial cross-sectional configuration view of a switchboard to which the present disclosure is applied.
Figure 7:
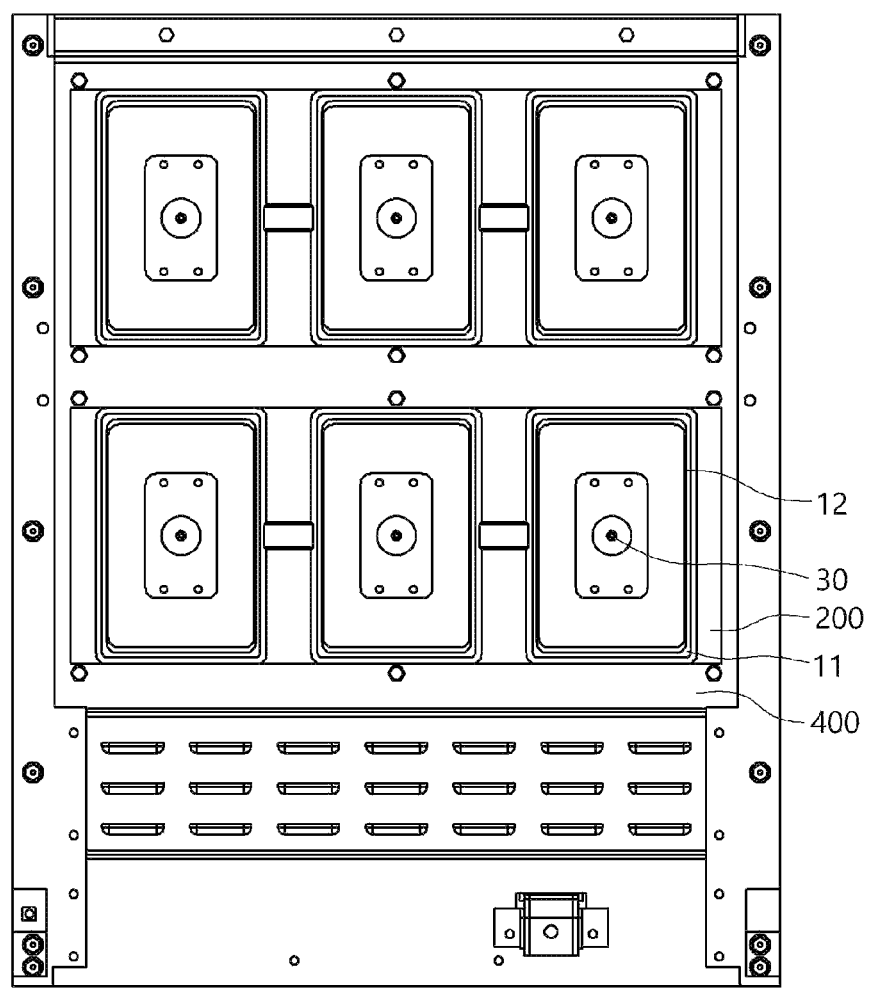
FIG. 7 is a rear view of the installed state of the present disclosure.

FIG. 6 is a partial cross-sectional configuration view of a switchboard to which the present disclosure is applied, and FIG. 7 is a rear view of the installed state of the present disclosure.

Referring to FIGS. 6 and 7, respectively, the present disclosure may be applied to a switchboard having a three-phase, two-row structure, and in this case, the current transformers in each row may be installed and maintained at the same time.

Specifically, by changing the installation surface 400 of the switchboard to a structure that can be fastened through the fastening hole 210 in a state in which the coupling block 200 is in contact, installation, maintenance and repair are facilitated.

In addition, since the current transformer 20 can be maintained and repaired without removing the bushing 10 from the front side when the current transformer 20 is replaced or repaired, the working time can be shortened.

The coupling block 200 may use an epoxy resin, and improvement of insulating properties can be expected according to the use of the epoxy resin.

As such, since the present disclosure uses one bushing 10, and by changing the design of the bushing 10, the fixing of the current transformer 20, the fixing of the terminal 30, and the connection of the busbar 910 and the terminal can be done using one bushing 10, the structure can be simplified and the length can be reduced.

In addition, by providing a bushing-type current transformer module that can be collectively applied to a plurality of phases, installation, maintenance and repair are easy.

While the present disclosure has been described in connection with what is presently considered to be practical exemplary embodiments, those skilled in the art may understand that the disclosure is not limited to the disclosed embodiments, but, on the contrary, is intended to cover various modifications and equivalent arrangements included within the spirit and scope of the appended claims. Accordingly, the true technical protection scope of the present disclosure shall be determined according to the attached claims.

The present disclosure relates to a bushing-type current transformer applied to a switchboard, and by changing the physical structure of the bushing-type current transformer, the volume can be reduced and maintenance can be facilitated, and thus has industrial applicability.

What is claimed is:

1. A bushing-type current transformer, comprising:
   a binding plate;
   a bushing comprising:
   a first integral fixing part having a cylindrical structure, facing a front side of a switchboard, and defining a first accommodating space; and
   a second integral fixing part having a rectangular cylindrical structure, facing a rear side of the switchboard, and defining a second accommodating space;
   wherein the first integral fixing part and the second integral fixing part are located on opposing sides of the binding plate;
   a current transformer fitted and fixed to the first integral fixing part of the bushing; and
   a terminal located in the first accommodating space, wherein a busbar is coupled within in the second accommodating space.

2. The bushing-type current transformer of claim 1, wherein the binding plate comprises a through hole communicating the first accommodating space with the second accommodating space, and the terminal is inserted and fixed into the through hole.

3. A switchboard having a bushing-type current transformer applied thereto, the switchboard comprising: the bushing-type current, transformer comprising:
   a bushing comprising:
   a first integral fixing part having a cylindrical structure, defining a first accommodation space, and facing a front side of the switchboard;
   a second integral fixing part having a rectangular cylindrical structure, defining a second accommodation space, and facing a rear side of the switchboard;
   wherein the first integral fixing part and the second integral fixing part are located on opposing sides of a binding plate; and
   a current transformer fitted and fixed to the first integral fixing part of the bushing;
   a terminal located in the first accommodating space of the first integral fixing part wherein a busbar is coupled within the second accommodating space of the second integral fixing part; and
   a coupling block comprising a fastening hole through which the second integral fixing part of the bushing-type current transformers is inserted, and coupled to an installation surface of the switchboard in a state of being coupled to the binding plate.

4. The switchboard having the bushing-type current transformer applied thereto of claim 3, wherein the coupling block is coupled to the installation surface such that the first integral fixing part of the bushing-type current transformer is located on the front side and the second integral fixing part is located on the rear side.

5. The switchboard having the bushing-type current transformer applied thereto of claim 3, wherein the binding plate comprises a through hole communicating an accommodating space of each of the first integral fixing part and the second integral fixing part, and the terminal is inserted and fixed into the through hole.

* * * * *